PHILLIP C. HALVERSON
HOWARD G. PRESTON
INVENTORS.

BY White & Haefliger

ATTORNEYS.

PHILLIP C. HALVERSON
HOWARD G. PRESTON
INVENTORS.

BY White & Haefliger

ATTORNEYS.

United States Patent Office 3,370,180

Patented Feb. 20, 1968

3,370,180

DECIMAL STORAGE APPARATUS EMPLOYING TRANSISTOR MONOSTABLE MULTIVIBRATOR

Phillip C. Halverson, Fullerton, and Howard G. Preston, Whittier, Calif., assignors to Brite-Lite Corporation of America, Phoenix, Ariz., a corporation of Delaware Filed Mar. 29, 1965, Ser. No. 443,417
6 Claims. (Cl. 307—238)

ABSTRACT OF THE DISCLOSURE

The disclosed apparatus operates to provide time domain storage of a decimal number, and includes a simple univibrator having stable and quasi-stable states. A set pulse input to a transistor shifts univibrator output to stable state, and clock pulse inputs to the same transistor shift output to quasi-stable state; also, a time delay shifts output from quasi-stable to stable state at synchronous intervals.

This invention relates generally to number storage, and more specifically concerns the electronic storage of numbers in decimal form.

It is a major object of the present invention to provide an improved and unusually effective storage device or unit capable of time domain storage of a number, and characterized as having certain functions as follows: the device has a stable state and a quasi stable state and is capable of being shifted therebetween; it has an input path or paths for a set or "store" pulse or input signal effecting a shift to the stable state from the quasi stable, and also for a clock pulse effecting a shift from stable state to quasi stable state; it has a state shifting time delay whereby a shift from quasi stable state to stable state may occur at regular intervals; and finally it has an output path for a signal resulting from the state shifting as described. Among the unusual advantages of the improved storage device are low cost, simplicity of construction, high reliability, independence of delay time from DC voltage supply, and the enablement through use and application of the storage device to realize simpler systems containing the device for performance of logical functions and computations in decimal form.

It is another object of the invention to provide in a device as described above, an improved univibrator having stable and quasi stable states and capable of being shifted therebetween, the univibrator having an input path for the set pulse and clock pulses as described, and a time delay network operable to effect shifting from quasi stable state to stable state after a time delay close to the counting base, the next clock pulse then resetting the univibraor state from stable to quasi stable. For example, if the counting base is 10 T where T is the clock pulse recurrence interval, the time delay may typically lie between 9 T and 10 T. Thus, if the set pulse occurs just before time 5 T, let us say, the delay times and next following clock pulses will operate to provide univibrator output pulses at times 15 T, 25 T and so on at regular intervals equal to the time base 10, no further set or store pulse being necessary. Accordingly, the device remembers the number 5, in a time stored form or domain. If another input number N is set in the univibrator, the 5 is cancelled and the new number is remembered, since an output pulse occurs at regular intervals N, $(10+N)$ T, $(20+N)$ T and so on.

It is still another object of the invention to provide an unusually simple and effective univibrator circuit. The latter includes a first transistor having emitter, base and collector electrodes, one of which has electrical connection with the input path, a second transistor having emitter, base and collector electrodes one of which has electrical connection with the output path, and an RC timing network having connection with electrodes of the transistors to effect shifting from quasi stable to stable state after predetermined time delay. In this regard, stable state may be achieved when both transistors are conducting or "on," and quasi stable state may be achieved when both transistors are off, so that the transistors are "on" only during a short pulse interval recurring at times equal to the time base, minimizing current drain.

These and other objects and advantages of the invention, as well as the details of illustrative embodiments, will be more fully understood from the following detailed description of the drawings in which.

Figure 1:
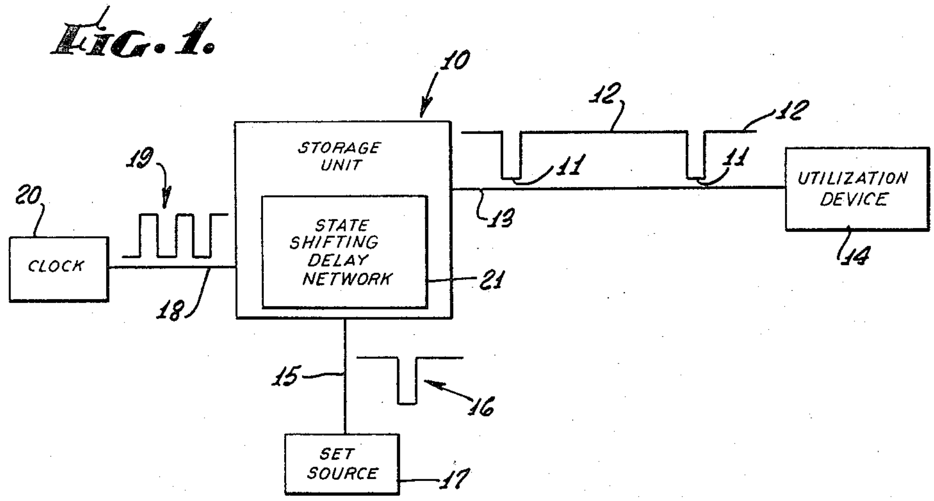
FIG. 1 is a block diagram showing the decimal storage device connected in a system.

Referring first to FIG. 1, a storage unit 10 as for example a univibrator is characterized as having stable and quasi stable states. For example, in stable state the output of the device might be characterized by a predetermined level current indicated at 11, whereas in quasi stable state the output might be at a different level, as for example zero current indicated at 12. An output path is seen at 13 connected with utilization device 14.

Unit 10 also has an input path 15 for a "set" pulse 16 derived from a source 17, the set pulse effecting a shift of unit 10 to stable state from quasi-stable state. In addition, unit 10 has an input path 18 for clock pulses 19 derived from typically free running clock 20, and typically the next clock pulse occurring after the shifting of device 10 to stable state serves to return the device 10 to quasi stable state.

The unit 10 is also characterized as having a state shifting time delay, as for example is indicated or produced by network 21. The latter serves to effect an automatic shift from quasi stable state to stable state after a delay time slightly less than the number system base being used. For example, if the base is 10, the delay time is typically fixed at between 9 T and 10 T, say 9.37 T, where T is the clock pulse recurrence interval. See in this regard the clock pulse waveform A, the set pulse waveform B and the output pulse waveform C in FIG. 2.

Figure 2:
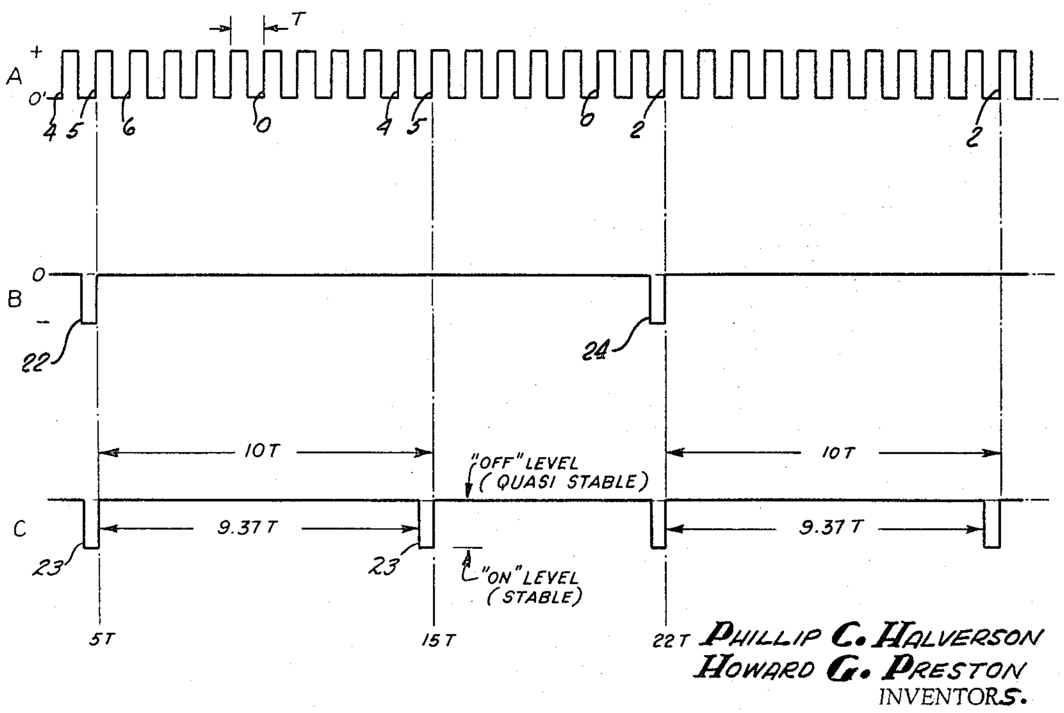
FIG. 2 shows typical clock, set pulse and output waveforms.

In FIG. 2, if a negative going set pulse 22 occurs within the 5 T interval as established between the fourth and fifth positive going clock pulses defining an interval T following an arbitrary zero, then the device 10 is driven from quasi stable to stable state; however, the fifth positive going clock pulse then drives device 10 back to quasi stable state. The number 5 may then be considered as stored since an output pulse 23 will recur at times 15 T, 25 T and so on, provided another number is not stored into the unit 10 by a set pulse. Note in FIG. 2 that the waveform A negative going clock pulse proceeds from + to 0 potential, while waveform B negative going set pulse proceeds from 0 to — potential.

Waveform C in FIG. 2 shows that just before time 15 T, the delay time 9.37 T after time 5 T has elapsed, whereby the device 10 is automatically reset to stable state; however, the next positive going clock pulse at time 15 T drives device 10 back to quasi stable state. Waveforms B and C also show the subsequent storage of the decimal number 2 by the set pulse 24. It should be mentioned that device 10 can be driven to stable state by either a set pulse or in response to the elapse of the delay time, as for example 9.37 T; however, in either case, next positive going clock pulse drives device 10 back to quasi stable state. It might also be added that "zero" is defined as the state of astorage unit 10 which is clock reset from its stable to its quasi stable state at times $t=0$; $t=10$ T, $t=20$ T and so on. The number storage condition of any other storage unit can be defined by its time related change of state with respect to the zero storage unit.

Figure 3:
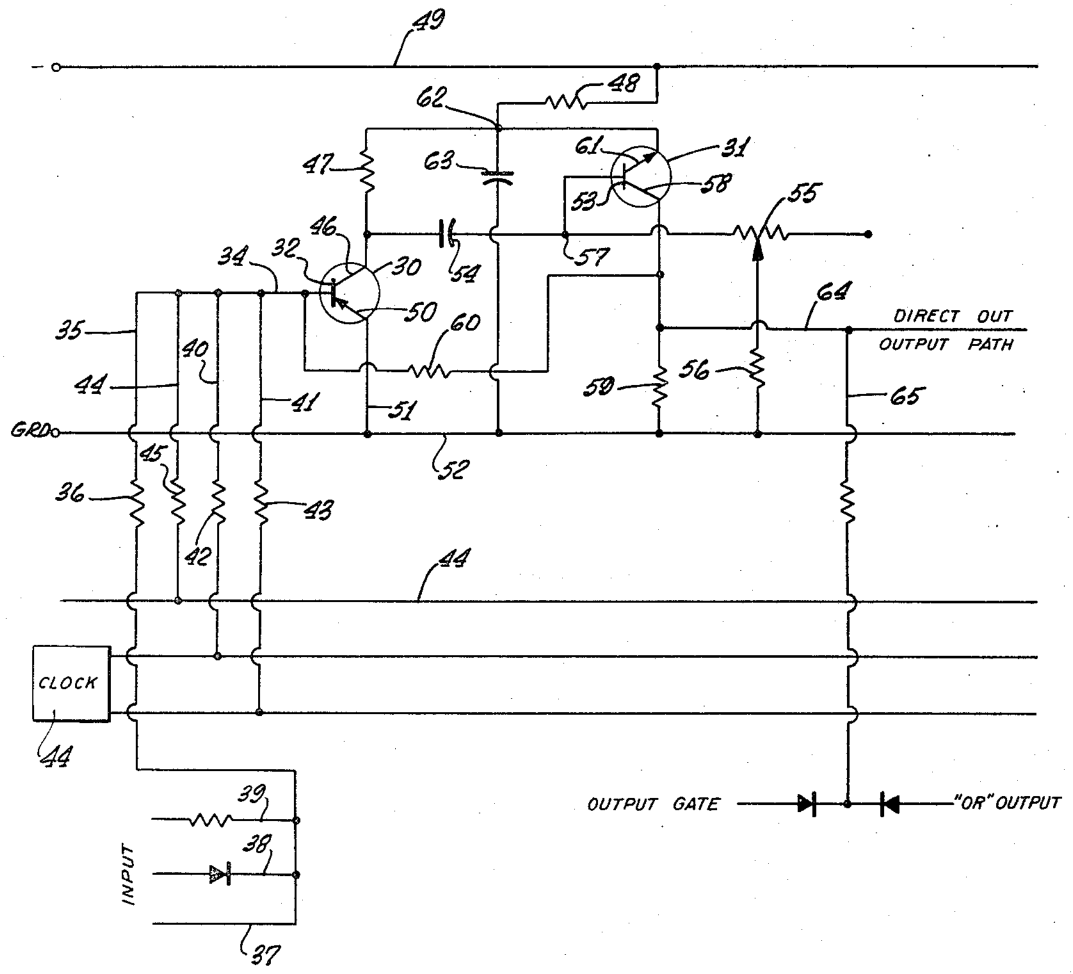
FIG. 3 shows a preferred form of the storage unit.

Turning now to FIG. 3, the univibrator means is shown in an unusually advantageous form characterized as inclusive of two transistors 30 and 31. The former has its base electrode 32 connected with the input path 34 to which a set pulse path 35 is connected, the latter including a resistor 36 and logic branches 37, 38 and 39. Clock pulse paths 40 and 41 are also connected to input path 34, path 40 including a low resistance 42 and providing a reduced or ground voltage input, and path 41 including a higher resistance 43 and providing a suitable positive input voltage level. A clock 44 serves to alternately energize paths 40 and 41 at a cycle frequency $1/T$. An auxiliary reset path is also indicated at 44 and includes a resistor 45.

The collector electrode 46 of transistor 30 is connected through resistors 47 and 48 with the DC negative supply 49, and its emitter electrode 50 is connected at 51 to ground 52.

The collector electrode 46 is connected with the base 53 of the second transistor 31 through a capacitor 54 in an RC network that also includes series connected potentiometer 55 and resistor 56, the latter connected to ground 52. Base 53 is connected to terminal 57 between capacitor 54 and potentiometer 55. The collector electrode 58 of transistor 31 is connected to ground through resistor 59 and to the base 32 of transistor 30 through feed back resistor 60. Finally, emitter 61 of transistor 31 is connected to terminal 62 between resistors 47 and 48, and a capacitor 63 is connected between terminal 62 and ground. Capacitor 63 and resistor 48 serve as power supply decouplers. Collector 58 also is connected to alternate output paths 64 and 65.

In operation, both transistors 30 and 31 are "on" or conducting in stable state; at which time capacitor 54 charges to the negative supply voltage. Base current for transistor 31 is provided through resistors 55 and 56, and for transistor 30 through feed back resistor 60.

As explained above, when the clock input voltage rises, the univibrator is driven to quasi stable state. Thus, the clock positive voltage application cuts off the base current to transistor 30, causing voltage at its collector 46 to drop to the negative supply voltage. Capacitor 54 then forces the voltage on the base 53 of transistor 31 to drop below the negative supply voltage, turning off transistor 31, achieving quasi stable state.

Subsequently, the voltage on the base 53 rises toward ground with a time constant determined by capacitor 54 and resistors 55 and 56 when the voltage on the base 53 becomes more positive than the negative supply, transistor 31 begins to conduct, i.e. after the delay interval, when the clock input voltage drops to ground, current is drawn from the base 32 of transistor 30 through resistor 60, turned on, achieving stable state.

Purely illustrative values for the circuit components are as follows.

Resistors:

| | |
|---|---|
| 36 | 4.7K. |
| 39 | 4.7K. |
| 42 | 2.2K. |
| 43 | 100K. |
| 45 | 10K. |
| 47 | 1K. |
| 48 | 10 ohms. |
| 55 | 10K. |
| 56 | 10K. |
| 59 | 1K. |
| 60 | 4.7K. |

Transistors:

| | |
|---|---|
| 30 | 2N 304. |
| 31 | 2N 2926. |

Capacitors:

| | |
|---|---|
| 54 | .047 uf. |
| 63 | .22 uf. |
| Ground supply voltage | —10 volts. |
| Clock positive voltage | 20 volts. |

Modifications may include the polarity inversion of the transistors, different component values and supply voltages, different type univibrator, different base of number system (octal, hexa decimal, etc.), and different time delays. For example, a device with a time delay set to 10.5 T (base 11) would assume the stable state at times $t_0$, $t_0+11t$, $t_0+22t$, $t_0+33t$, etc., and could be used as an automatically incrementing counter.

We claim:

1. In a device to provide time domain storage of a decimal number, univibrator means having a stable state and a quasi stable state and capable of being shifted therebetween, said means having an input path for a set pulse effecting a shift to said stable state from said quasi stable state and for a clock pulse effecting a shift from said stable state to said quasi stable state, said means characterized as having a state shifting time delay whereby a shift from said quasi stable state to said stable state may occur at regular intervals, and said means having an output path for a signal resulting from said shifting, said univibrator means including a first transistor to which said input path is connected to pass both said set pulse and said clock pulse to said first transistor.

2. The combination of claim 1 wherein said univibrator means includes a time delay network operable to effect shifting from said quasi stable state to said stable state after a delay time between 9 T and 10 T where T is the clock pulse recurrence interval.

3. The combination of claim 1 wherein first transistor has emitter, base and collector electrodes, said base electrode having electrical connection with said input path, said univibrator means also including a second transistor having emitter, base and collector electrodes one of which has electrical connection with said output path, and said univibrator means includes an RC network having connection with electrodes of said transistors and operable to effect said shifting from said quasi stable state to said stable state after predetermined time delay.

4. The combination of claim 3 wherein said transistors have interconnection to be electrically conductive in said stable state and to be electrically nonconductive in said quasi stable state, said two transistors being the only transistors in said univibrator means.

5. The combination of claim 1 including a free running clock connected with said means to provide a clock pulse at said input path at predetermined recurrence intervals less than said regular intervals.

6. The combination of claim 3 wherein said first transistor base electrode is connected with said input path to receive both said clock and set pulses, said first transistor collector electrode connected with the second transistor base electrode through a capacitor in said RC network, the second transistor collector electrode being connected with said output path.

References Cited

UNITED STATES PATENTS 3,113,221 12/1963 Okuda ............ 307—88.5

JOHN S. HEYMAN, *Primary Examiner.*

ARTHUR GAUSS, *Examiner.*